(12) United States Patent
Dombrowski et al.

(10) Patent No.: US 7,702,497 B2
(45) Date of Patent: Apr. 20, 2010

(54) METHOD FOR RECOMMENDING UPGRADE COMPONENTS FOR A COMPUTER SYSTEM

(75) Inventors: Chris Dombrowski, Cary, NC (US);
James Gordon McLean, Fuquay-Varina, NC (US); Cristina Medina, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 11/567,019

(22) Filed: Dec. 5, 2006

(65) Prior Publication Data
US 2008/0133211 A1    Jun. 5, 2008

(51) Int. Cl.
G06F 9/445 (2006.01)
H04L 12/26 (2006.01)

(52) U.S. Cl. ............... 703/22; 703/24; 709/223; 717/168; 717/177

(58) Field of Classification Search ............ 703/2, 703/22, 24; 709/223; 717/168, 177
See application file for complete search history.

(56) References Cited

U.S. PATENT DOCUMENTS

| | | | |
|---|---|---|---|
| 5,287,505 A | | 2/1994 | Calvert et al. |
| 7,401,057 B2 * | | 7/2008 | Eder ............ 706/20 |
| 2002/0188942 A1 | | 12/2002 | Bryan et al. |
| 2003/0023963 A1 | | 1/2003 | Birkholz et al. |
| 2003/0110175 A1 | | 6/2003 | Yao |
| 2003/0140139 A1 | | 7/2003 | Marejka et al. |
| 2003/0212603 A1 | | 11/2003 | Arita |
| 2005/0086335 A1 * | | 4/2005 | Liu et al. ............ 709/223 |

* cited by examiner

Primary Examiner—Thai Phan
(74) Attorney, Agent, or Firm—Cynthia G. Seal; Jeffrey L. Streets

(57) ABSTRACT

Method and computer program product for recommending cost effective upgrades for a computer system. At least one performance parameter is determined for an existing computer system. Up to date performance specifications for available upgrade components are obtained. A variety of potential systems are modeled utilizing at least one upgrade component, and at least one component from the existing system to create upgrade scenarios. At least one performance parameter is predicted for each upgrade scenario. The performance parameters for the upgrade scenarios are compared to the performance parameters of the existing computer system. The cost-effectiveness is determined for each upgrade scenario, and upgrade recommendations are made when the cost-effectiveness meets or exceeds a target value.

19 Claims, 4 Drawing Sheets

METHOD FOR RECOMMENDING UPGRADE COMPONENTS FOR A COMPUTER SYSTEM

BACKGROUND OF THE INVENTION

1. Field of the Invention

The present invention relates to methods and systems for identifying upgrades for a computer system configuration.

2. Description of the Related Art

Our society has become very dependent upon the ability of computers to handle complex tasks and automate routine processes. The drive to harness this ability has led to a pervasive use of computers in all aspects of modern life. Personal computer systems are used to produce documents, run complex mathematical problems, send and receive email, access the Internet, control manufacturing processes, and so much more. Server systems must store and quickly access huge amounts of data, run complex databases, handle Internet and other communication tasks, and participate in various and changing system management protocols. In a scalable environment, multiple individual computer processors or systems must work in concert to handle the required tasks. The demands placed on these computers can change rapidly as new applications are adopted and whole generations learn to rely upon them for everyday tasks.

Regardless of sophistication, computer systems are comprised of a combination of inter-related components. Whether the system is a personal computer (PC) or a server in a business environment, the system may be upgraded through the substitution or replacement of its component parts or by the inclusion of additional components. Upgrade components may also vary in scope from individual subcomponents, like a memory chip, to groups of complete computer systems. The availability of new technology has lead to large leaps in computer performance and this trend is expected to continue for the foreseeable future. As a result, an established computer system can quickly become outdated and perform poorly as demand increases.

The load on a computer system is the set of tasks the system is instructed to complete. When the load is known or predictable, the performance of an existing computer system with upgraded components may be modeled to predict performance. However, the point at which businesses can benefit the most from upgrading existing systems is difficult to determine and complicated by ever-changing component types, specification and costs.

Rapid advances in technology offer many opportunities for increased efficiency in the workplace. However, due to the number of vendors and the array of computer hardware and software products available in today's market, it is often difficult to determine when any particular upgrade is desirable or cost-effective. Still, there exists a need to predict the performance of a computer system under various conditions and to identify ways of improving that performance. It would be desirable to have a method of predicting this performance that could recommend ways of improving performance of the existing computer system. It would be even more desirable if the method could identify one or more of the most cost-effective ways to achieve the improved performance at any particular point in time.

SUMMARY OF THE INVENTION

The present invention provides a method of recommending upgrades for a computer system and a computer program product for performing the method. The method determines at least one performance parameter for the existing computer system. The method then obtains performance specifications for one or more upgrade components. The method then models upgrade scenarios for various combinations of existing system components and upgrade components. The model predicts at least one performance parameter of each upgrade scenario. The performance parameters of the existing computer system are compared to the predicted performance parameters of the upgrade scenarios in order to quantify performance benefits associated with each of the one or more upgrade scenarios.

The method may further comprise determining a cost-effectiveness of the upgrade scenarios, wherein the cost-effectiveness is a configurable relationship between the predicted performance parameters of the upgrade scenarios and the performance parameters of the existing computer system. Optionally, upon the determination of cost-effectiveness, the method may recommend upgrades when the cost-effectiveness meets or exceeds a target value. Further, the method may model one or more upgrade scenarios associated with enabling on-demand software or hardware residing in the existing computer system, or allow for purchase of recommended upgrades.

DETAILED DESCRIPTION

Figure 1:
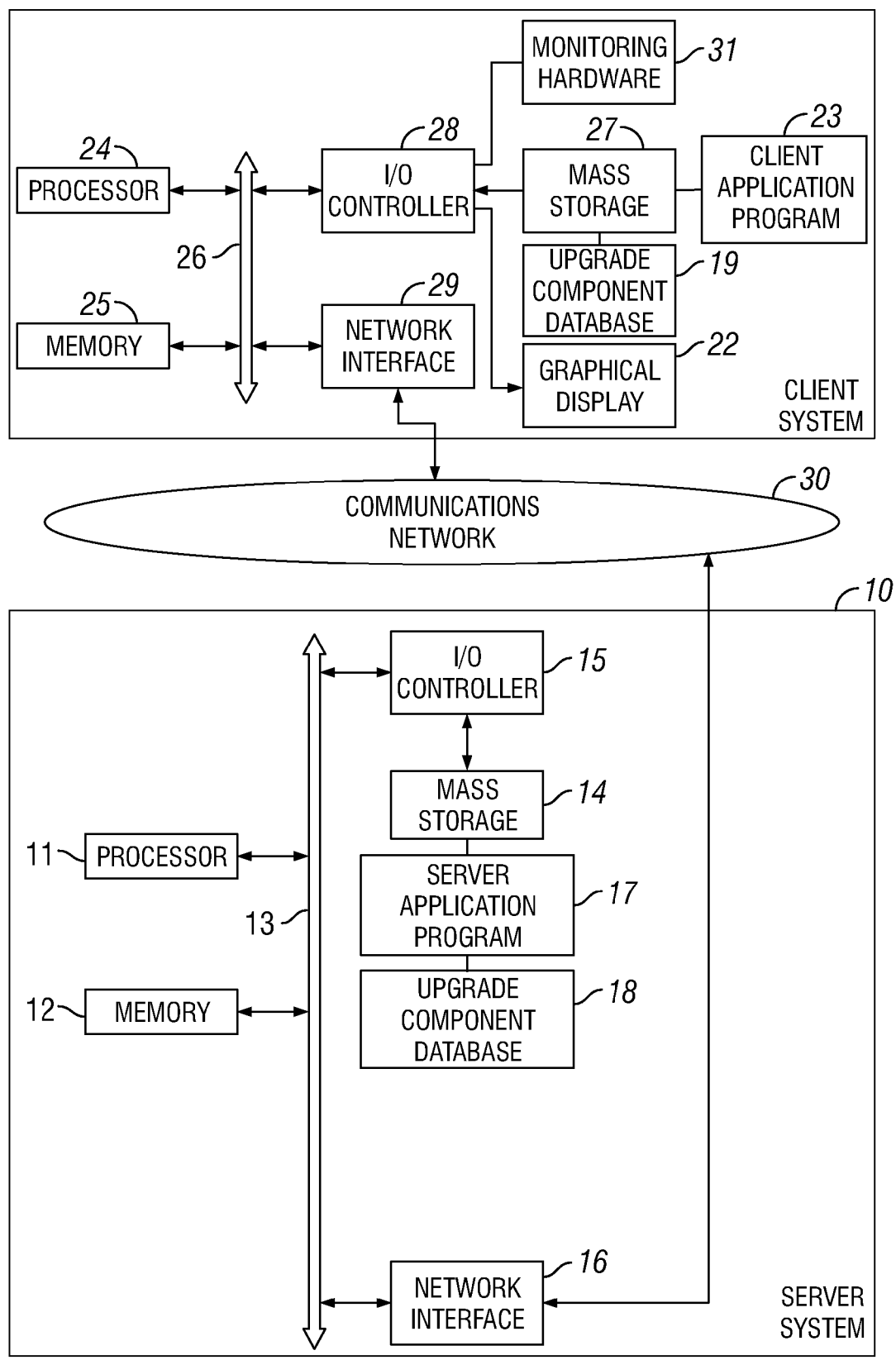
FIG. 1 is a schematic diagram of a client system and a remote server in communication over a network.

The present invention provides a method for modeling and predicting performance parameters for a plurality of upgrade scenarios for an existing computer system. The method establishes at least one performance parameter for the existing computer system. The performance parameter may be any metric used to assess performance of a computer system such as millions of instructions per second (MIPS), time to compile, database access time, server response time to clients, processor load, etc. The method then obtains specifications for at least one upgrade component. At least one upgrade scenario is modeled, including at least one of the upgrade components in combination with at least as portion of the existing system component, in order to predict a performance parameter for the upgrade scenario. The performance parameter of the upgrade scenario is then compared to the performance parameter of the existing computer system. A report is preferably provided to show the changes in performance that could be expected if the existing computer system were upgraded to include the upgrade components associated with each upgrade scenario.

In one embodiment, the existing computer system is monitored, and one or more performance parameters of the existing computer system are determined. The monitoring system may include hardware and software. Existing computer performance monitoring solutions may be utilized for this purpose. One example is the Windows® Performance Monitor. Such an application may monitor performance parameters and provide access to this data through an application programming interface. Alternatively, the method and computer program product of the invention may provide independent monitoring of performance.

Specifications for available upgrade components are obtained from a database of upgrade components via the internet, a local area network (LAN), a wide area network (WAN), or from a file stored locally on the existing computer system. Optionally, the specifications may be obtained electronically whenever there is a change to the database, or at determined time intervals. This may take the form of downloading information to a local database, accessing a remote database via a network upon receiving a notification that there have been changes to the remote database, or accessing the remote database via a network at predetermined time intervals. The specifications may also be physically obtained, such as loading a floppy disk containing information generated by the database, or keying in information from a report generated by the remote database. Such specifications may be provided by component vendors, distributors or retailers.

The database of upgrade components contains a list of currently available upgrade components, specifications for each of the currently available upgrade components, and preferably, current pricing for each of the currently available upgrade components. The upgrade components may include items such as random access memory (RAM), read only memory (ROM), motherboards, printed circuit boards (commonly referred to as "cards"), additional server blades, high speed switches, data storage devices, communication devices, or any other component of a computer system. The upgrade components may include multiple simultaneous upgrades affording a move to a new technology or protocol (for example, a change from wired to optical fiber based communication technology). The upgrade components may also include software. The specifications may include performance parameters for the upgrade components, either singly or when utilized in combination with other upgrade components, such as dimensions, duty cycle ratings, MIPS, or any other characteristics of the upgrade components. The pricing information may be listed for single upgrade components or combinations of upgrade components. The pricing information may also be time-sensitive, limited to a particular customer/vendor contract, or any other applicable restrictions, and include validity or applicability rules.

After determining one or more performance parameters of the existing computer system, one or more upgrade scenarios can be modeled. Each modeled upgrade scenario preferably uses at least one of the existing computer system components in combination with one or more upgrade components. However, it may also be possible to model an upgrade scenario comprising the replacement of the system under analysis with an entirely new system. Additionally it may be possible to model an upgrade scenario consisting of the addition of new systems to the existing set of systems under analysis. Each upgrade scenario is modeled to predict at least one performance parameter. The predicted performance parameters may be based upon models that use historical data, or known future jobs. After predicting one or more performance parameters of the upgrade scenario, these performance parameters are compared to the one or more performance parameters of the existing computer system. A level of performance improvement associated with an upgrade scenario is then determined, and a report can be provided, preferably including some measure of cost-effectiveness. The report is most preferably configurable to show the predicted performance parameters, including the cost-effectiveness, of the upgrade scenarios and, therefore, the cost-effectiveness of the upgrade components. The report may also provide an opportunity for the user to enable any on-demand upgrade components in the existing computer system or purchase upgrade components as desired.

The method can be configured to run periodically, manually on demand by the user, whenever the database of upgrade components is updated, or upon the occurrence of any triggering event. A change in availability or pricing of the upgrade components may affect the selection of upgrade scenarios to be modeled, or the desirability of that upgrade scenario based upon the resulting cost-effectiveness parameter. A cost/benefit analysis may be configured to evaluate the upgrade scenarios, and their desirability. The configuration of the cost/benefit analysis may include the performance parameter of the existing computer system, the predicted performance parameter of the upgrade scenario, costs associated with the upgrade components included in the upgrade scenario, installation costs, the expected life of the upgrade components, and any other applicable factors.

FIG. 1 is a schematic diagram of a server system 10 in communication with a client computer 20 through a network, such as the Internet 30. The client computer 20 includes conventional components such as a processor 24, memory 25 (e.g. RAM), a bus 26 which couples the processor 24 and memory 25, a mass storage device 27 (e.g. a magnetic hard disk or an optical storage disk) coupled to the processor and memory through an I/O controller 28 and a network interface 29, such as a conventional modem. The client system 20 may be a personal computer, but the system is most likely a server system. The server system 10 also includes conventional components such as a processor 11, memory 12 (e.g. RAM), a bus 13 which couples the processor 11 and memory 12, a mass storage device 14 (e.g. a magnetic or optical disk) coupled to the processor 11 and memory 12 through an I/O controller 15 and a network interface 16, such as a conventional modem.

It should be appreciated that the present method may be implemented in software that is stored as executable instructions on a computer readable medium on the server system 10, such as in mass storage device 14 or in memory 12. The server system 10 is shown having a server application program 17, and an upgrade component database 18, stored in mass storage device 14. The application program can apply the method and generate upgrade scenarios with predicted performance parameters. The list of upgrade scenarios with predicted performance parameters can then be presented in a manner viewable by the client system 20. This list may be displayed on a web page accessible to the client system, emailed to the client system, or listed in a file downloadable by the client system. The list may also be sent physically, such as in printed reports mailed to the user of the client system, or saved to non-volatile memory such as a floppy disk, or flash memory and mailed to the user of the client system.

The present method may also be implemented in software that is stored as executable instructions on a computer readable medium on the client system 20, such as in mass storage device 27 or in memory 25. The client system 20 is shown having a client application program 23, and an upgrade component database 19. Alternatively, the client application program 23 may communicate with the upgrade component database 18, stored in mass storage device 14 on the server 10, in order to obtain specifications for the upgrade components.

The present method may also utilize monitoring hardware or software 31 to establish the at least one performance parameter for the existing client system 10. The monitoring hardware or software may accomplish tasks such as tracking types of tasks and obtaining performance data for each type of task, as well as the number and type of task performed. The monitoring hardware or software reports to the modeling application program that is also in communication with the upgrade component database to determine when changes are made to the upgrade component database.

The communications network 30 is the medium used to provide communications links between the server 10 and any number of various devices and computers (individually represented as computer 20). The communications network 30 may include permanent connections, such as wire or fiber optic cables, or temporary connections made through telephone or wireless communications. The server system may include additional servers, clients, routers and other devices not shown. In the example of FIG. 1, the network system 30 may include the Internet (a worldwide collection of networks and gateways that use the TCP/IP suite of protocols to communicate with one another). Of course, the Web application server 10 may also communicate over a number of different types of networks, such as, for example, an intranet, a local area network (LAN), or a wide area network (WAN).

It should be recognized that the implementation of the method may take the form of an entirely hardware embodiment, an entirely software embodiment, or an embodiment containing both hardware and software elements. In particular embodiments, including those embodiments of methods, the invention may be implemented in software, which includes but is not limited to firmware, resident software and microcode.

Furthermore, the invention can take the form of a computer program product accessible from a computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W), DVD—read only memory (DVD-ROM), and DVD—read/write (DVD-R/W).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 2:
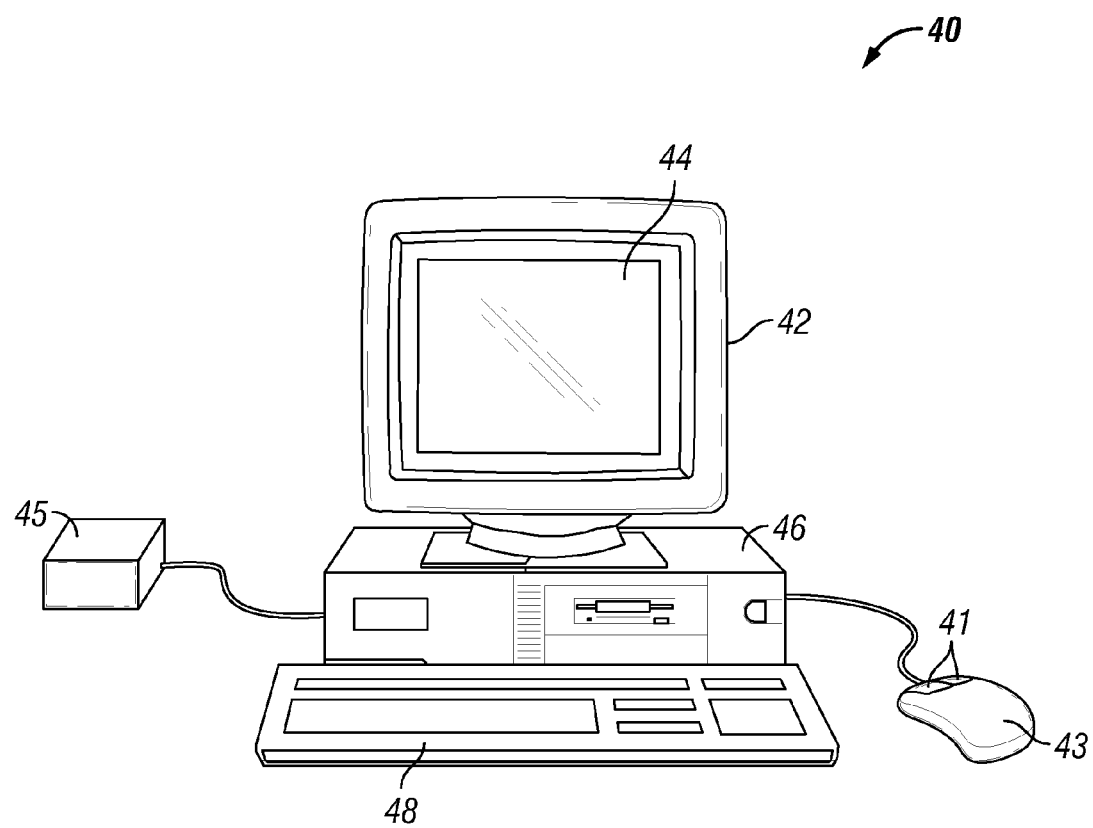
FIG. 2 is a computer system having various typical input and output devices.

FIG. 2 is a computer system having various typical input and output devices. The computer system 40 includes a display device 42 (such as a monitor), a display screen 44, a cabinet 46 (which encloses components typically found in a computer, such as CPU, RAM, ROM, video card, hard drive, sound card, serial ports, etc.), a keyboard 48, a mouse 43 and a modem 45. The mouse 43 may have one or more buttons, such as buttons 41. The computer requires some type of communication device such as modem 45 that allows computer system 40 to be connected to the Internet. Other possible communication devices include Ethernet network cards, or wireless network cards. The computer system 40 may serve as the client system 10 or may be used in association with the client system 10.

Figure 3:
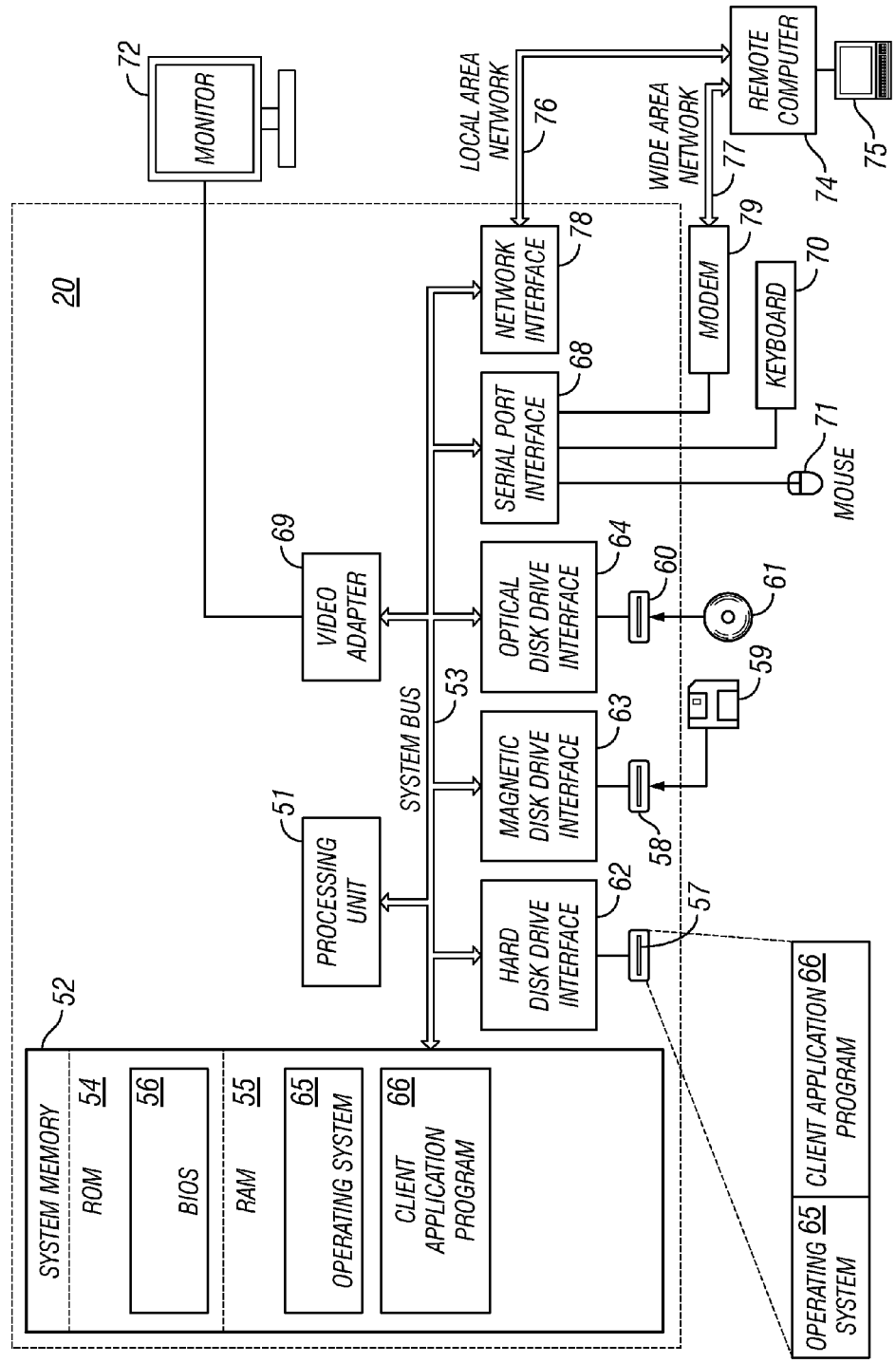
FIG. 3 is a schematic diagram of a computer system having network access for interacting with an application server

FIG. 3 is a schematic diagram of a computer system 50 that may be representative of client and server systems utilized in association with the present invention. The system 50 may be a general-purpose computing device in the form of a conventional personal computer 50. Generally, a personal computer 50 includes a processing unit 51, a system memory 52, and a system bus 53 that couples various system components including the system memory 52 to processing unit 51. System bus 53 may be any of several types of bus structures including a memory bus or memory controller, a peripheral bus, and a local bus using any of a variety of bus architectures. The system memory includes a read-only memory (ROM) 54 and random-access memory (RAM) 55. A basic input/output system (BIOS) 56, containing the basic routines that help to transfer information between elements within personal computer 50, such as during start-up, is stored in ROM 54.

Computer 50 further includes a hard disk drive 57 for reading from and writing to a hard disk 57, a magnetic disk drive 58 for reading from or writing to a removable magnetic disk 59, and an optical disk drive 60 for reading from or writing to a removable optical disk 61 such as a CD-ROM or other optical media. Hard disk drive 57, magnetic disk drive 58, and optical disk drive 60 are connected to system bus 53 by a hard disk drive interface 62, a magnetic disk drive interface 63, and an optical disk drive interface 64, respectively. Although the exemplary environment described herein employs hard disk 57, removable magnetic disk 59, and removable optical disk 61, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for computer 50. For example, the operating system 65 and application programs, such as a client application 66, may be stored in the RAM 55 and/or hard disk 57 of the computer 50.

A user may enter commands and information into personal computer 50 through input devices, such as a keyboard 70 and a pointing device, such as a mouse 71. Other input devices (not shown) may include a microphone, joystick, game pad, satellite dish, scanner, or the like. These and other input devices are often connected to processing unit 51 through a serial port interface 68 that is coupled to the system bus 53, but input devices may be connected by other interfaces, such as a parallel port, game port, a universal serial bus (USB), or the like. A display device 72 may also be connected to system bus 53 via an interface, such as a video adapter 69. In addition to the monitor, personal computers typically include other peripheral output devices (not shown), such as speakers and printers.

The computer 50 may operate in a networked environment using logical connections to one or more remote computers 74. Remote computer 74 may be another personal computer, a server, a client, a router, a network PC, a peer device, a mainframe, a personal digital assistant, an Internet-connected mobile telephone or other common network node. While a remote computer 74 typically includes many or all of the elements described above relative to the computer 50, only a memory storage device 75 has been illustrated in the figure. The logical connections depicted in the figure include a local area network (LAN) 76 and a wide area network (WAN) 77. Such networking environments are commonplace in offices, enterprise-wide computer networks, intranets, and the Internet.

When used in a LAN networking environment, the computer 50 is often connected to the local area network 76 through a network interface or adapter 78. When used in a WAN networking environment, the computer 50 typically includes a modem 79 or other means for establishing high-speed communications over WAN 77, such as the Internet. A modem 79, which may be internal or external, is connected to system bus 53 via serial port interface 68. In a networked environment, program modules depicted relative to personal computer 50, or portions thereof, may be stored in the remote memory storage device 75. It will be appreciated that the network connections shown are exemplary and other means of establishing a communications link between the computers may be used. A number of program modules may be stored on hard disk 57, magnetic disk 59, optical disk 61, ROM 54, or RAM 55, including an operating system 65 and client application 66.

The described example shown in FIG. 3 does not imply architectural limitations. For example, those skilled in the art will appreciate that the present method may be implemented in other computer system configurations, including hand-held devices, multiprocessor systems, multi-node or clustered systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 4:
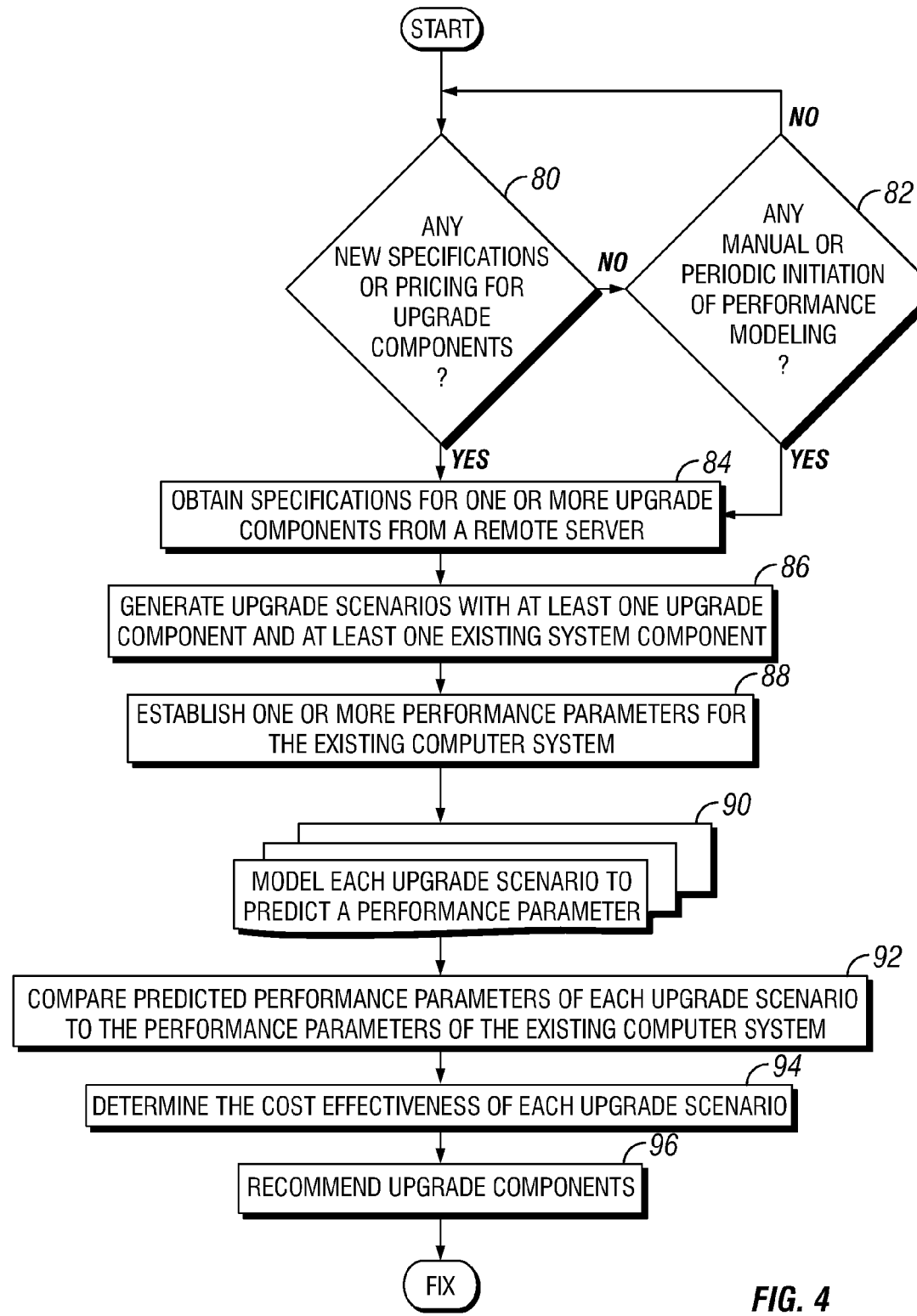
FIG. 4 is a flowchart describing the steps of a method for recommending upgrades.

FIG. 4 is a flowchart describing a method of recommending upgrade components. In steps 80 and 82, an initiating event causes the method to be run. The initiating event may be a specified time period, an update or change to the upgrade component database, a manual initiation by the user, detection of a performance problem, traffic level, or load threshold, or any user defined condition or event. As shown, step 80 determines whether any new specifications or pricing data is available for upgrade components. If not, then step 82 determined whether any manual or periodic initiation of the performance modeling process has been requested. If not, then steps 80 and 82 are repeated until an initiating event has been detected.

In step 84, specifications for available upgrade components are obtained, such as from a remote server. The specifications may include compatibility data, dimensions, pricing, and any other applicable characteristics of the upgrade components. In step 86, upgrade scenarios are generated utilizing a combination of existing system components and upgrade components. Numerous upgrade scenarios may be generated in this step. All of the permutations of existing system components with available upgrade components may be considered.

In step 88, one or more performance parameters are established for the existing computer system. In establishing the one or more performance parameters, the hardware and software configurations of the existing computer system may be considered, in conjunction with the historical job types, and future scheduled jobs. At least one performance parameter is determined to quantify the performance of the existing computer system. The desired at least one performance parameter may be any measurable parameter that the user considers significant. The performance parameter of the existing computer system is needed as an input to the modeling of the upgrade scenario and also for comparison with a predicted performance parameter of the upgrade scenario.

In step 90, one or more performance parameters are predicted for each upgrade scenario generated in step 86. These one or more performance parameters are preferably of the same type as the one or more performance parameters determined for the existing system. If multiple performance parameters are determined for the existing computer system, the same performance parameters are preferably predicted for the upgrade scenarios.

In step 92, predicted performance parameters of each upgrade scenario are compared to the performance parameters of the existing computer system. This comparison may be configurable. A ratio, difference amount, or any other relative strength equation may be utilized. In step 94, the cost-effectiveness of each upgrade scenario is determined. The cost-effectiveness will be dependent upon the degree of predicted improvement, i.e. the relative improvement of the predicted performance parameter in relationship to the existing performance parameter, as well as a cost to implement. This cost-effectiveness is configurable to incorporate business needs and goals. For example, if time to compile is a rate limiting step, and speed is desired, the ratio of relative improvement to cost may be set to a low desired target value. By contrast, if millions of instructions per second (MIPS) is not a key variable, the ratio of relative improvement to cost may be set to a high desired target value. Any desired equation can be input to generate a cost-effectiveness rating.

In step 96, the process generates a report that recommends upgrade components. The recommendation may be triggered by a cost-effectiveness rating above a target point. This target is configurable for the user. Preferably, the report will detail several different upgrade scenarios and their associated performance parameters and cost-effectiveness. The report may provide a ranking or comparative analysis of the various possible upgrade scenarios. The report may be utilized in any way, including direct transmission to the system owner, transmission to a customer sales representative, or transmission to a third party.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   establishing one or more performance parameters for an existing computer system having a plurality of components;
   obtaining a performance specification for at least one available upgrade component capable of substitution for one of the components of the existing computer system;
   modeling at least one upgrade scenario that includes the substitution of at least one upgrade component in combination with at least one component of the existing computer system;
   predicting at least one performance parameter of each upgrade scenario; and
   comparing the performance parameter of each upgrade scenario to the one or more performance parameters of the existing computer system to determine a level of performance improvement associated with each upgrade scenario.

2. The method of claim 1, wherein the performance specification for the available upgrade component is located in a database, wherein the database is maintained on a separate computer system, on the existing computer system, or downloaded to the existing computer system.

3. The method of claim 1, wherein the performance specification for each upgrade component includes a current cost of the component, the method further comprising:
   identifying a cost-effectiveness parameter of at least one upgrade scenario.

4. The method of claim 3, wherein the cost-effectiveness parameter of a particular upgrade scenario is determined based upon a configurable relationship between the predicted performance parameter of the upgrade scenario, the performance parameter of the existing computer system, and the current cost of the available upgrade components.

5. The method of claim 4, further comprising:
   receiving a notification when the remote server is updated;
   repeating the steps of predicting the at least one performance parameter of each upgrade scenario and identifying the cost-effectiveness parameter of at least one upgrade scenario when the notification is received.

6. The method of claim 4, further comprising:
   detecting that the existing computer system has reached a performance threshold or workload level;
   repeating the steps of predicting the at least one performance parameter of each upgrade scenario and identifying the cost-effectiveness parameter of at least one upgrade scenario in response to reaching the performance threshold or workload level.

7. The method of claim 5, further comprising:
   configuring the relationship between the predicted performance parameter of the upgrade, the performance parameter of the existing computer system, and the current cost of the available upgrade components.

8. The method of claim 7, further comprising:
   providing an option to enable on-demand components on the existing system or purchase recommended upgrade components.

9. The method of claim 1, further comprising:
   generating a notice in response to identifying an upgrade scenario that meets or exceeds a target value for the performance parameter.

10. The method of claim 9, further comprising:
    configuring the desired target value for the performance parameter.

11. The method of claim 1, further comprising:
    monitoring existing computer system to determine the one or more performance parameters for the existing computer system.

12. The method of claim 1, further comprising:
    predicting the at least one performance parameter of each upgrade scenario as compared to the one or more performance parameters of the existing system based upon common data throughput.

13. The method of claim 1, further comprising:
    modeling the existing computer system to predict one or more performance parameters for the existing computer system based on job types, throughput data, and known hardware and software configurations.

14. The method of claim 13, further comprising:
    modeling a plurality of upgrade scenarios to predict the at least one performance parameter for each upgrade scenario based on job types, throughput data, and known hardware and software configurations.

15. A computer program product comprising a computer usable medium including computer usable program code for searching a database, the computer program product including:
    computer usable program code for determining one or more performance parameters for an existing computer system having a plurality of components, wherein the performance parameters are configurable;
    computer usable program code for obtaining a performance specification for at least one available upgrade component capable of substitution for one of the components of the existing computer system, wherein the performance specification is stored in a computer file, or input by the user;
    computer usable program code for modeling at least one upgrade scenario that includes substitution of at least one upgrade component in combination with at least one of the components of the existing computer system;
    computer usable program code for predicting the at least one performance parameter of each upgrade scenario; and
    computer usable program code for comparing the performance parameter of each upgrade scenario to the performance parameter of the existing computer system to determine a level of performance improvement associated with each upgrade scenario.

16. The computer program product of claim 15, further comprising:
    computer usable program code for reading or downloading data from a computer file located on a separate computer.

17. The computer program product of claim 16, further comprising:
    computer usable program code for identifying a cost-effectiveness parameter of at least one upgrade scenario, wherein the cost effectiveness parameter is configurable by the user.

18. The computer program product of claim 17, further comprising:
    computer usable program code for recommending upgrades when the cost effectiveness parameter meets or exceeds a configurable target value.

19. The computer program product of claim 18, further comprising:
    computer usable program code for enabling on-demand hardware or software on the existing computer system, or purchase recommended upgrades.

* * * * *

UNITED STATES PATENT AND TRADEMARK OFFICE
CERTIFICATE OF CORRECTION

PATENT NO. : 7,702,497 B2  
APPLICATION NO. : 11/567019  
DATED : April 20, 2010  
INVENTOR(S) : Dombrowski et al.

Page 1 of 1

It is certified that error appears in the above-identified patent and that said Letters Patent is hereby corrected as shown below:

On the title page, item 75, the inventor's name "Cristina Medina" should read -- Cristian Medina --.

Signed and Sealed this  
Eleventh Day of June, 2013

Teresa Stanek Rea  
*Acting Director of the United States Patent and Trademark Office*